United States Patent [19]

Kaneko et al.

[11] Patent Number: 4,493,532

[45] Date of Patent: Jan. 15, 1985

[54] PLEOCHROIC AZO DYES, A LIQUID CRYSTAL COMPOSITION CONTAINING THE AZO DYES AND A DISPLAY DEVICE USING THE LIQUID CRYSTAL COMPOSITION

[75] Inventors: Masaharu Kaneko, Kanagawa; Tetsuo Ozawa, Tokyo; Tomio Yoneyama, Kanagawa; Shuji Imazeki, Ibaraki; Akio Mukoh, Ibaraki; Mikio Sato, Ibaraki, all of Japan

[73] Assignees: Hitachi, Ltd.; Mitsubishi Chemical Industries, Ltd., both of Tokyo, Japan

[21] Appl. No.: 442,057

[22] Filed: Nov. 16, 1982

[30] Foreign Application Priority Data

Nov. 16, 1981 [JP] Japan .................. 56-183366
Jan. 28, 1982 [JP] Japan .................. 57-12084
Feb. 10, 1982 [JP] Japan .................. 57-20130

[51] Int. Cl.$^3$ .................. G02F 1/13; C09K 3/34; C09B 29/00; C09B 31/00; C09F 9/00
[52] U.S. Cl. .................. 350/349; 252/299.1; 534/577
[58] Field of Search .......... 252/299.1, 299.67, 299.68; 350/349; 260/155, 152, 169, 172, 173, 178, 179, 180, 181, 182, 183, 184, 185, 187, 189–191, 194, 196, 202, 199, 201, 207

[56] References Cited

U.S. PATENT DOCUMENTS

| | | | |
|---|---|---|---|
| 3,930,794 | 1/1976 | Birke et al. .................. | 260/174 |
| 4,122,027 | 10/1978 | Cole, Jr. et al. .................. | 252/299.1 |
| 4,128,497 | 12/1978 | Cole, Jr. et al. .................. | 252/299.1 |
| 4,137,193 | 1/1979 | Osman et al. .................. | 252/299.1 |
| 4,145,114 | 3/1979 | Coates et al. .................. | 252/299.1 |
| 4,308,161 | 12/1981 | Aftergut et al. .................. | 252/299.1 |
| 4,308,162 | 12/1981 | Cole, Jr. et al. .................. | 252/299.1 |
| 4,308,163 | 12/1981 | Aftergut et al. .................. | 252/299.1 |
| 4,308,164 | 12/1981 | Aftergut et al. .................. | 252/299.1 |
| 4,350,603 | 9/1982 | Aftergut et al. .................. | 252/299.1 |
| 4,359,398 | 11/1982 | Cole, Jr. et al. .................. | 252/299.1 |
| 4,395,350 | 7/1983 | Boller et al. .................. | 252/299.1 |
| 4,401,369 | 8/1983 | Jones .................. | 252/299.1 |
| 4,411,812 | 10/1983 | Aftergut et al. .................. | 252/299.1 |
| 4,426,312 | 1/1984 | Claussen .................. | 252/299.1 |

FOREIGN PATENT DOCUMENTS

| | | | |
|---|---|---|---|
| 65869 | 12/1982 | European Pat. Off. ......... | 252/299.1 |
| 76633 | 4/1983 | European Pat. Off. ......... | 252/299.1 |
| 3235761 | 3/1983 | Fed. Rep. of Germany ... | 252/299.1 |
| 53-75180 | 7/1978 | Japan .................. | 252/299.1 |
| 56-57850 | 5/1981 | Japan .................. | 252/299.1 |
| 58-21451 | 2/1983 | Japan .................. | 252/299.1 |

OTHER PUBLICATIONS

Demus, D. et al., FLussice Kristalle in Tabellen, Veb Deutscher Verlag, Leipzig, 1974.
Jones, F. et al., Mol. Cryst. Liq. Cryst., vol. 60, pp. 99–110, (1980).
Cognard, J. et al., Mol. Cryst. Liq. Cryst., vol. 68, pp. 207–229, (1981).
Cox, R. J., Mol. Cryst. Liq. Cryst., vol. 55, pp. 1–32, (1979).
Seki, H. et al., Jpn. J. Appl. Phys., vol. 21, No. 1, pp. 191–192, (Jan. 1982).
Naikdwadi, K. P. et al., Ind. J. Chem., vol. 20B, No. 2, pp. 165, (2/1981).
Bloom, A., et al., Mol. Cryst. Liq. Cryst., vol. 40, pp. 213–221, (1977).

*Primary Examiner*—Teddy S. Gron
*Attorney, Agent, or Firm*—Sughrue, Mion, Zinn, Macpeak, and Seas

[57] ABSTRACT

Pleochroic azo dyes represented by the formula (I):

$$Y-\begin{pmatrix}Z^1 & Z^2\\ & \\ Z^3\end{pmatrix}-N=N-\left(\begin{pmatrix}Z^4 & Z^5\\ & \\ Z^6\end{pmatrix}-N=N\right)_n-\begin{pmatrix}Z^7 & Z^8\\ & \\ Z^9\end{pmatrix}-X \quad (I)$$

wherein X represents group $-OCOR^1$ or $-COOR^1$ (wherein $R^1$ represents an alkyl group, an alkoxyalkyl group, an alkoxyphenyl group, an alkylcyclohexyl group, an alkoxyalkylcyclohexyl group, a cycloalkylcyclohexyl group, an alkoxycyclohexyl group, or a (Abstract continued on next page.)

phenyl group substituted by a substituent selected from among an alkyl group containing 3 to 18 carbon atoms, an alkoxyalkyl group, a cycloalkyl group, an aryl group, a cyano group, a halogen atom, an acyloxy group, a carboxylic acid ester group, and an arylazo group); Y represents a hydrogen atom, an alkyl group, an alkoxyalkyl group, a cycloalkyl group, an alkoxy group, a nitro group, a cyano group, a carboxylic acid ester group, an acyloxy group, an alkylsulfonyl group, an aryl group, a halogen atom, or group

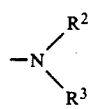

wherein $R^2$ and $R^3$ each represents a hydrogen atom, an alkyl group, an alkoxyalkyl group, or $R^2$ and $R^3$ may be connected to each other to form a nitrogen-containing ring together with the adjacent nitrogen atom; $Z^1$ to $Z^9$ each represents a hydrogen atom, a halogen atom, a methyl group, a hydroxy group, a methoxy group or a cyano group, or $Z^1$, $Z^2$ and $Z^3$ may be connected to $R^2$ or $R^3$ to form a nitrogen-containing ring, or $Z^1$ and $Z^2$, and $Z^4$ and $Z^5$, or $Z^7$ and $Z^8$ may be connected to each other to form an aromatic ring; at least one of

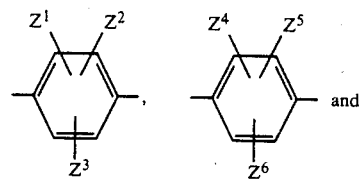

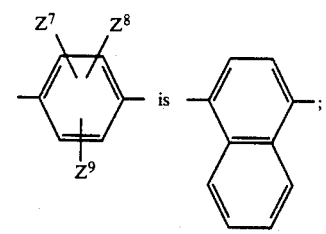

and n represents 0, 1 or 2, a liquid crystal composition containing the pleochroic azo dyes and a display device using the liquid crystal composition.

2 Claims, 7 Drawing Figures

PLEOCHROIC AZO DYES, A LIQUID CRYSTAL COMPOSITION CONTAINING THE AZO DYES AND A DISPLAY DEVICE USING THE LIQUID CRYSTAL COMPOSITION

FIELD OF THE INVENTION

The present invention relates to pleochroic azo dyes and a liquid crystal composition and a display device containing the azo dyes.

BACKGROUND OF THE INVENTION

Pleochroic dye molecules have the property that the amount of light that they absorb depends on their orientation to the electric vector of the incident radiation. That is, the absorption of light by the dye molecules is maximized when the electric vector of the light is parallel to the transition axes of them, and is minimized when the electric vector of the light is perpendicular to the axes of them.

In the aforesaid liquid crystal display device, orientation of the dye molecules can be changed by utilizing the phenomenon that the orientation direction of liquid crystal molecules is changed by applying a voltage. Thus, the amount of light that dye molecules absorb in such liquid crystal display device can be changed by applying a voltage. This phenomenon is called "guest-host effect" taking the liquid crystal compound as host and the dye as guest.

Of the pleochroic dyes, those which have parallel dichroism show such properties that the direction of transition axis of visible light absorption is almost parallel to the longer axis of the molecule and, when dissolved as a guest molecule in a host liquid crystal material, the dye molecules are aligned so that the longer axis of the dye molecule becomes to be parallel to the orientation direction of liquid crystal molecules.

For example, in a liquid crystal display device containing a liquid crystal material comprising a pleochroic dye with parallel dichroism and nematic liquid crystal compounds with positive dielectric anisotropy and having been subjected to homogeneous orientation treatment, the dye molecules form a homogeneous alignment wherein the longer axis of the dye molecule is aligned in parallel with electrode planes similarly with the liquid crystal molecules. When white light traveling in a perpendicular direction to the electrode planes and polarized to the same direction as the average direction of the oriented liquid crystal molecules travels through the liquid crystal layer in the above-described state, the electric vector of the light becomes parallel with the average direction of the dye molecules and, as a result, a particular wavelength region is strongly absorbed, thus the liquid crystal layer taking a strongly colored state. Application of a voltage to the liquid crystal layer in the above-described state causes homeotropic alignment of the longer axis of the dye molecule due to the positive dielectric anisotropy of the host liquid crystal. In this state, the average direction of the longer axes of the dye molecules becomes perpendicular to the electric vector of incident white light, and hence the incident light is scarcely absorbed by the dye molecule and, as a result, the liquid crystal layer takes a wealky colored state.

The guest-host effect can be obtained not only by utilizing nematic liquid crystal compounds as described above but by utilizing, for example, smectic liquid crystal compounds or utilizing cholesteric-nematic phase change as well. In the case of utilizing phase transition, each molecule of a cholesteric liquid crystals in a device having been subjected to homogeneous orientation treatment takes a helical arrangement (the helical axis perpendicular to the electrode plane). When white non-polarized light travels through the liquid crystal layer in a direction perpendicular to the electrode planes, a particular wavelength region of all planes of polarization of the light can be strongly absorbed by the dye molecules and, as a result, the liquid crystal layer appears strongly colores. When the host cholesteric liquid crystal have positive dielectric anisortopy, application of a voltage to the liquid crystal layer in the above-described state causes homeotropic alignment of the longer axis of the dye molecule following the liquid crystal molecule due to the relaxation of the helical arrangement of the liquid crystal molecules, thus the liquid crystal layer appearing weakly colored.

The pleochroic dyes as described above are required to possess: (1) a high "order parameter" (presented as S) in a host liquid crystal; (2) a sufficient solubility in a host liquid crystal; (3) a high stability against light, heat, and electricity; and (4) a hue according to the end-use. Of these factors, at least (1) and (2) are required for raising contrast of a resulting display device.

The order parameter S is defined by the equation (I) and is experimentally determined by the equation (II):

$$S = (3\cos^2\theta - 1)/2 \tag{I}$$

$$S = (A_{//} - A\perp)/(2A\perp + A_{//}) \tag{II}$$

wherein the term of $\cos^2\theta$ is timewise averaged, $\theta$ represents an angle which the transition axis of the dye molecule makes with the average direction of host liquid crystal molecules, and $A_{//}$ and $A\perp$ represent the absorbances of the dye molecules for the light polarized parallel to and perpendicular to the average direction of the host liquid crystal, respectively.

With pleochroic dyes having parallel dichroism, the nearer the S value to 1 which is the theoretical maximum, the less the degree of residual color in a weakly colored state, which serves to realize high brightness, high contrast display.

An object of the present invention is to provide novel pleochroic dyes having parallel dichroism and capable of satisfying the aforesaid requirements (1), (2) and (4), a liquid crystal composition which can produce high contrast, high brightness display, and a display device containing the composition.

Relationship between the molecular structure of pleochroic dye and the various properties has not fully been clarified yet, and hence it is quite difficult to select a pleochroic dye which has a desired hue and satisfies all requirements described hereinbefore based on knowledges about known dyes.

SUMMARY OF THE INVENTION

As a result of intensive investigations, the inventors have found that particularly order parameter and solubility of azo dyes can be improved by introducing a saturated or unsaturated ring, or a benzene ring or cyclohexane ring, into azo dye skeleton via ester bond, thus having achieved the present invention based on this finding.

That is, the object of the present invention is to provide pleochroic azo dyes represented by the formula (I):

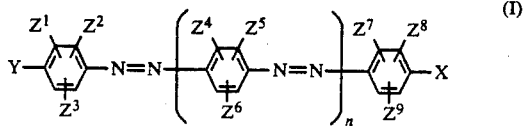

wherein X represents group —OCOR¹ or —COOR¹ (wherein R¹ represents an alkyl group, an alkoxyalkyl group, an alkoxyphenyl group, an alkylcyclohexyl group, an alkoxycyclohexyl group, a cycloalkylcyclohexyl group, an alkoxycyclohexyl group, or a phenyl group substituted by a substituent selected from among an alkyl group containing 3 to 18 carbon atoms, an alkoxyalkyl group, a cycloalkyl group, an aryl group, a cyano group, a halogen atom, an acyloxy group, a carboxylic acid ester group, and an arylazo group); Y represents a hydrogen atom, an alkyl group, an alkoxyalkyl group, a cycloalkyl group, an alkoxy group, a nitro group, a cyano group, a carboxylic acid ester group, an acyloxy group, an alkylsulfonyl group, an aryl group, a halogen atom, or group

wherein R² and R³ each represents a hydrogen atom, an alkyl group, or an alkoxyalkyl group, or R² and R³ may be connected to each other to form a nitrogen-containing ring together with the adjacent nitrogen atom); Z¹ to Z⁹ each represents a hydrogen atom, a halogen atom, a methyl group, a hydroxy group, a methoxy group or a cyano group, or Z¹, Z² and Z³ may be connected to R² or R³ to form a nitrogen-containing ring, or Z¹ and Z², Z⁴ and Z⁵, or Z⁷ and Z⁸ may be connected to each other to form an aromatic ring; and n represents 0, 1 or 2, and to provide a liquid crystal composition and a display device containing the azo dyes.

Figure 3:
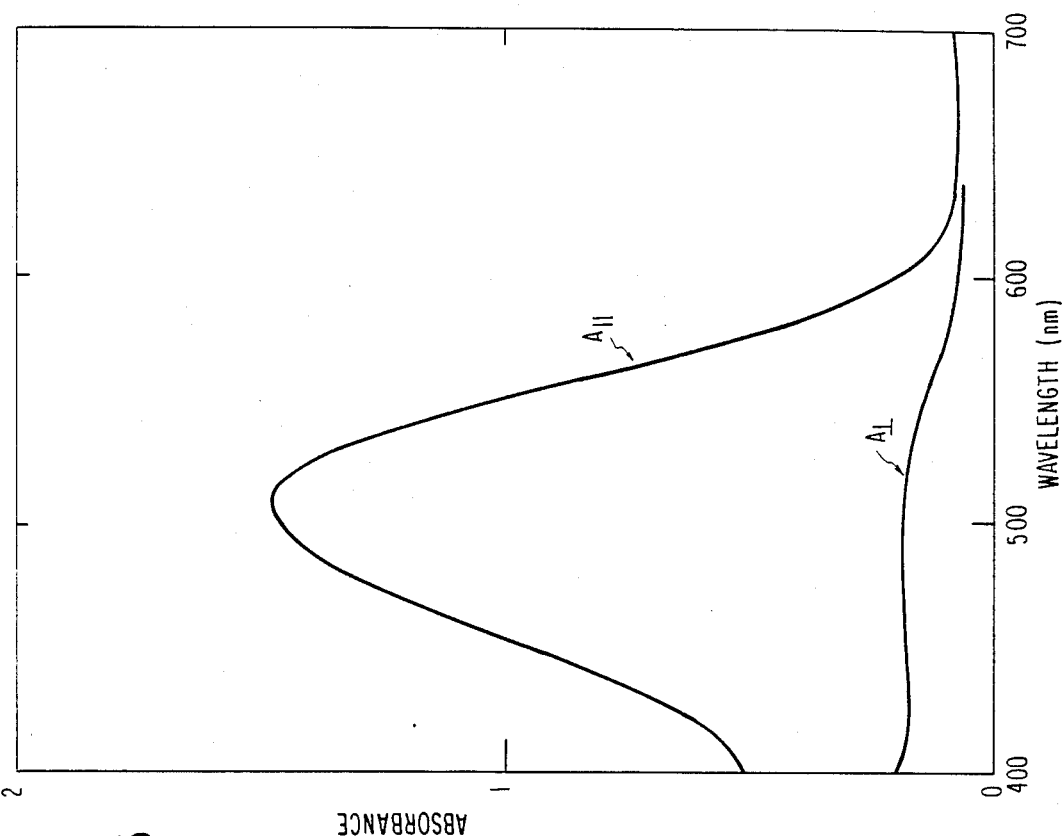
FIGS. 2, 3, 4 and 5 show absorption spectra of the display devices in accordance with the present invention.

In those Figures, numeral 3 designates liquid crystal molecules, and 4 pleochroic dye molecules.

DETAILED DESCRIPTION OF THE INVENTION

The present invention is described in more detail below. The pleochroic azo dyes of the present invention represented by the foregoing formula (I) are novel dyes having excellent order parameter and solubility in a liquid crystal material and having good stability. Specific examples of R¹ in the foregoing formula (I) include an alkylcyclohexyl group substituted by a straight or branched chain alkyl group such as a propyl group, a butyl group, a pentyl group, a hexyl group, a heptyl group, an octyl group, a nonyl group, a dodecyl group, an octadecyl group, etc.; an alkoxyalkylcyclohexyl group substituted by an alkoxyalkyl group such as a methoxymethyl group, propoxymethyl group, butoxymethyl group, butoxyethyl group, etc.; a cycloalkylcyclohexyl group substituted by a cycloalkyl group such as a cyclohexyl group, a propylcyclohexyl group, a butylcyclohexyl group or a heptylcyclohexyl group; an alkoxycyclohexyl group substituted by an alkoxy group such as a propoxy group, a butoxy group or an octoxy group; a phenyl group substituted by a methyl group, an ethyl group or a straight or branched alkyl group containing 3 to 18 carbon atoms; a phenyl group substituted by an alkoxyalkyl group such as a methoxymethyl group, a propoxymethyl group, a butoxymethyl group, a butoxyethyl group or an octyloxyethyl group; a phenyl group substituted by an alkoxy group such as a methoxy group, an ethoxy group, a butoxy group, a hexyloxy group or a nonyloxy group; a phenyl group substituted by a cycloalkyl group such as a cyclohexyl group, a propylcyclohexyl group, a butylcyclohexyl group or an octylcyclohexyl group; a phenyl group substituted by an aryl group such as a phenyl group, a butylphenyl group, an octylphenyl group, a butoxyphenyl group or a heptyloxyphenyl group; a cyanophenyl group; a phenyl group substituted by a halogen atom such as a fluorine atom, a chlorine atom or a bromine atom; a phenyl group substituted by an acyloxy group such as an acetoxy group, a pentanoyloxy group, an octanoyloxy group, a benzoyloxy group, a butylbenzoyloxy group, an octylbenzoyloxy group, a butoxybenzoyloxy group, a pentylcyclohexylcarbonyloxy group,

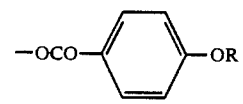

(wherein R is exemplified by a straight or branched chain propyl, butyl, hexyl, octyl, dodecyl or octadecyl group), or

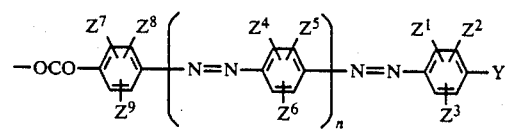

(wherein Y, Z¹ to Z⁹, and n are the same as defined in the formula (I)); a phenyl group substituted by a carboxylic acid ester group such as a methoxycarbonyl group, a butoxycarbonyl group, an octoxycarbonyl group, a propylcyclohexyloxycarbonyl group, a heptylcyclohexyloxycarbonyl group, a phenoxycarbonyl group, a butylphenoxycarbonyl group, a nonylphenoxycarbonyl group, a butoxyphenoxycarbonyl group, an octoxyphenoxycarbonyl group, a pentylcyclohexylphenoxycarbonyl group, or

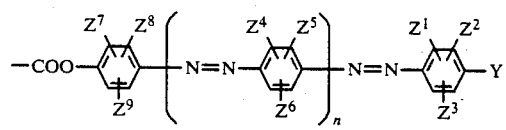

(wherein Y, $Z^1$ to $Z^9$, and n are the same as defined in the formula (I)); and a phenyl group substituted by an arylazo group such as is represented by

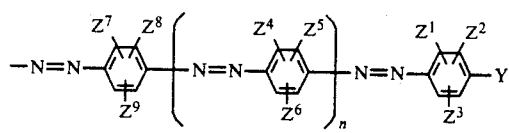

(wherein Y, $Z^1$ to $Z^9$, and n are the same as defined in the formula (I)).

Specific examples of Y in the formula (I) include a hydrogen atom; an alkyl group such as a methyl group, an ethyl group, a straight or branched propyl group, a butyl group, a heptyl group, an octyl group, a dodecyl group or an octadecyl group; an alkoxyalkyl group such as a methoxymethyl group, a propoxymethyl group, a butoxymethyl group, a butoxyethyl group or an octyloxyethyl group; a cycloalkyl group such as a cyclohexyl group, a propylcyclohexyl group, a butylcyclohexyl group or a heptylcyclohexyl group; an alkoxy group such as a methoxy group, a propoxy group, a pentoxy group, an octoxy group or an octadecyl group; a nitro group; a cyano group; a carboxylic acid ester group such as a methoxycarbonyl group, an octoxycarbonyl group, a propylcyclohexyloxycarbonyl group, a heptylcyclohexyloxycarbonyl group, a butylphenoxycarbonyl group, a butoxyphenoxycarbonyl group or a pentylcyclohexylphenoxycarbonyl group; an acyloxy group such as an acetoxy group, a pentanoyloxy group, an octanoyloxy group, a butylbenzoyloxy group, a butoxybenzoyloxy group or a pentylcyclohexylcarbonyloxy group; an alkylsulfonyl group such as an ethylsulfonyl group, a butylsulfonyl group or an octylsulfonyl group; an aryl group such as a phenyl group, a butylphenyl group, an octylphenyl group, a butoxyphenyl group or a heptyloxyphenyl group; a halogen atom such as a fluorine atom, a chlorine atom or a bromine atom; and group

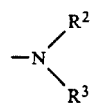

When Y represents

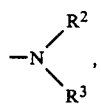

$R^2$ and $R^3$ each represents a hydrogen atom; an alkyl group such as a methyl group, an ethyl group, a propyl group, a butyl group or an octyl group; an alkoxyalkyl group such as a methoxymethyl group, a propoxymethyl group, a butoxymethyl group, a butoxyethyl group or an octyloxyethyl group; or $R^2$ and $R^3$ may be connected to each other to form a nitrogen-containing ring such as a morpholine ring or a piperidine ring.

Specific examples of $Z^1$ to $Z^9$ include a hydrogen atom, a methyl group, a hydroxy group, a methoxy group, a cyano group, a halogen atom (e.g., a fluorine atom, a chlorine atom or a bromine atom), or $Z^1$, $Z^2$ or $Z^3$ may be connected to $R^2$ or $R^3$ to form a nitrogen-containing ring as in the case where

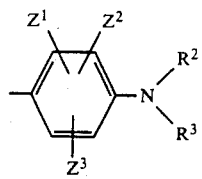

represents

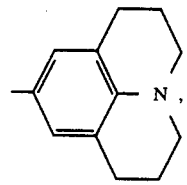

or $Z^1$ and $Z^2$, $Z^4$ and $Z^5$, or $Z^7$ and $Z^8$, may be connected to each other to form part of a benzene ring.

The pleochroic azo dyes represented by the formula (I) are prepared by, for example, reacting a compound represented by the formula (IV):

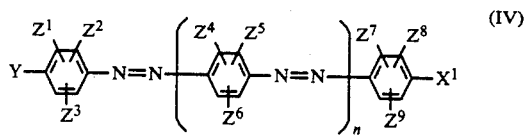

with a compound represented by the formula (V):

$$R^1 X^2 \qquad (V)$$

(wherein $X^1$ and $X^2$ each represents a hydroxy group or a carboxylic acid halide group provided that, when $X^1$ represents a hydroxy group, $X^2$ represents a carboxylic acid halide group and, when $X^1$ represents a carboxylic acid halide group, $X^2$ represents a hydroxy group; and $R^1$, Y, $Z^1$ to $Z^9$, and n are the same as defined in the general formula (I)) in a known manner.

The pleochroic azo dyes represented by the formula (II) can be prepared by, for example, reacting a compound represented by the formula (VI):

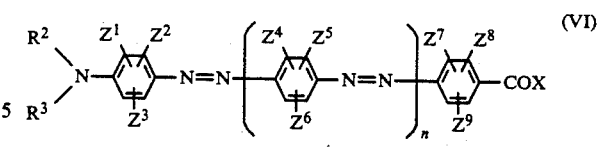

(wherein X represents a halogen atom, and $R^2$, $R^3$, $Z^1$ to $Z^9$, and n are the same as defined in the formula (II)) with a compound represented by the formula (VII):

$$R^1 OH \qquad (VII)$$

(wherein $R^1$ is the same as defined in the formula (II)) in a known manner.

Further, the pleochroic disazo dyes represented by the formula (III) are prepared by, for example, reacting a compound represented by the formula (VIII):

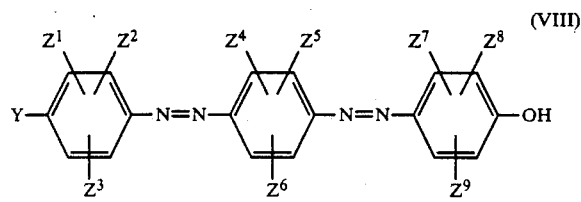

(wherein Y and $Z^1$ to $Z^9$ are the same as defined in the formula (III)) with a compound represented by the formula (IX):

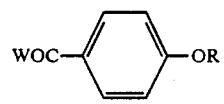

(wherein W represents a halogen atom, and R is the same as defined in the formula (III)) in a known manner.

Nematic liquid crystals to be used in the present invention can be selected from a considerably wide range of liquid crystals as long as they show a negatic state in an operating temperature range. Such nematic liquid crystals can take a cholesteric state when an optically active substance is added thereto. Examples of nematic liquid crystals include the substances given in Table 1 and derivatives thereof.

TABLE 1

| No. | Type | Example |
|---|---|---|
| 1 | Cyclohexylcyclohexane type | R'—(H)—(H)—X |
| 2 | Phenylcyclohexane type | R'—(H)—(phenyl)—X |
| 3 | Biphenyl type | R'—(phenyl)—(phenyl)—X |
| 4 | Terphenyl type | R'—(phenyl)—(phenyl)—(phenyl)—X |
| 5 | Cyclohexylcyclohexanoate type | R'—(H)—COO—(H)—X |
| 6 | Phenyl cyclohexylcarboxylate type | R'—(H)—COO—(phenyl)—X |
| 7 | Ester type | R'—(phenyl)—COO—(phenyl)—X |
| 8 | Diester Type | R'—(phenyl)—COO—(phenyl)—COO—(phenyl)—X<br>X—(phenyl)—COO—(phenyl)—COO—(phenyl)—R' |
| 9 | Biphenyl cyclohexylcarboxylate type | R'—(H)—COO—(phenyl)—(phenyl)—X |

TABLE 1-continued

| No. | Type | Example |
|---|---|---|
| 10 | Biphenyl ester type | R'—⟨C6H4⟩—⟨C6H4⟩—COO—⟨C6H4⟩—X <br> X—⟨C6H4⟩—⟨C6H4⟩—COO—⟨C6H4⟩—R' |
| 11 | Thioester type | R'—⟨C6H4⟩—COS—⟨C6H4⟩—X |
| 12 | Schiff type | R'—⟨C6H4⟩—CH=N—⟨C6H4⟩—X <br> X—⟨C6H4⟩—CH=N—⟨C6H4⟩—R' |
| 13 | Pyrimidine type | R'—⟨C6H4⟩—⟨pyrimidine⟩—X <br> R'—⟨pyrimidine⟩—⟨C6H4⟩—X <br> R'—⟨C6H4⟩—⟨pyrimidine⟩—X <br> R'—⟨pyrimidine⟩—⟨C6H4⟩—X |
| 14 | Dioxane type | R'—⟨dioxane⟩—⟨C6H4⟩—X |
| 15 | Cyclohexylmethyl ether type | R'—⟨H⟩—CH2O—⟨C6H4⟩—X <br> R'—⟨H⟩—CH2O—⟨C6H4⟩—⟨C6H4⟩—X |
| 16 | Cinnamonitrile type | R'—⟨H⟩—⟨C6H4⟩—CH=CH—X |

In the above formulae, R' represents an alkyl group or an alkoxy group, and X represents a nitro group, a cyano group or a halogen atom.

Liquid crystals given in Table 1 all show a positive dielectric anisotropy. Known ester type, azoxy type, azo type, Schiff type, pyrimidine type, diester type or biphenyl ester type liquid crystals showing a negative dielectric anisotropy can also be used by mixing with a liquid crystal showing a positive dielectric anisotropy so that the resulting mixed liquid crystal shows in the whole a positive dielectric anisotropy. Further, liquid crystals showing a negative dielectric anisotropy can be used as such by employing a proper element device constitution and a proper driving method.

As the host liquid crystal substance to be used in the present invention, any of the liquid crystal compounds shown in Table 1 and the mixtures thereof may be used. A liquid crystal substance sold by Merck & Co. under the trade name of ZLI 1132 which is a mixture of the following four liquid crystal compounds:

$C_3H_7$—(H)—⟨⟩—CN    38.4% by weight $C_5H_{11}$—(H)—⟨⟩—CN    34.2% by weight $C_7H_{15}$—(H)—⟨⟩—CN    18.1% by weight $C_5H_{11}$—(H)—⟨⟩—⟨⟩—CN    9.3% by weight and a liquid crystal substance sold by British Drug House Co. under the trade name E-7 which is a mixture of the following four liquid crystal compounds:

$C_5H_{11}$—⟨⟩—⟨⟩—CN    51% by weight $C_7H_{15}$—⟨⟩—⟨⟩—CN    25% by weight $C_8H_{17}O$—⟨⟩—⟨⟩—CN    16% by weight $C_5H_{11}$—⟨⟩—⟨⟩—⟨⟩—CN    8% by weight have been found to be particularly useful in the present invention.

As the optically active substance to be used in the present invention, there are illustrated chiral nematic compounds such as those prepared by introducing an optically active group (e.g., a 2-methylbutyl group, a 3-methylbutoxy group, a 3-methylpentyl group, a 3-methylpentoxy group, a 4-methylhexyl group, or a 4-methylhexyloxy group) to a nematic liquid crystal compound. In addition, optically active substances such as alcohol derivatives (e.g., l-menthol, d-borneol, etc.) shown in Japanese Patent Laid-Open No. 45546/76, ketone derivatives (e.g., d-camphor, 3-methylcyclohexanone, etc.), carboxylic acid derivatives (e.g., d-citronellic acid, l-camphoric acid, etc.), aldehyde derivatives (e.g., d-citronellal, etc.), alkene derivatives (e.g., d-limonene, etc.), amines, amides, nitriles, etc., can of course be used.

As the element device, known element devices for liquid crystal display can be used in the present invention. That is, in general, there are used those element devices which are constituted by two glass plates at least one of which is transparent, which are in parallel with each other and spaced from each other via a proper spacer, and on which a transparent plane electrode of arbitrary pattern is provided in a facing manner. The spacer decides the gap between the two glass plates. From the practical point of view, the element gap is preferably 3 to 100 μm, most preferably 5 to 50 μm.

The pleochroic dyes having parallel dichroism to be used in the liquid crystal composition of the present invention and the liquid crystal composition containing the dye are described in detail by reference to examples.

EXAMPLE 1

Synthesis examples of the pleochroic dyes of the present invention are first given, and order parameter (S) and maximum absorption wavelength (λ max) of each dye are tabulated in Table 2.

Synthesis Example 1

5.15 g of p-n-octylbenzoic acid was reacted with 4.8 g of thionyl chloride together with 50 ml of dioxane and 0.2 ml of dimethylformamide at 90° to 100° C. for 2 hours. After cooling the reaction solution to 50° C., 7.5 g of an azo type compound of the structural formula:

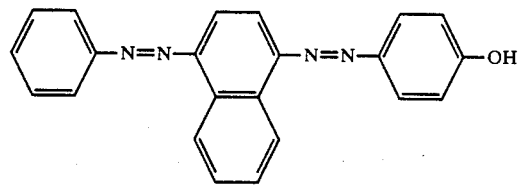

synthesized by a known process, 30 ml of dioxane, and 10 ml of triethylamine were added thereto, and reaction was conducted at 80° C. for 3 hours. After cooling to a room temperature, the reaction mixture was poured into 500 ml of water. Purification of the precipitate thus formed by column chromatography yielded dye No. 5 given in Table 2 to be shown hereinafter. This dye showed a melting point of 127.1° to 127.5° C.

SYNTHESIS EXAMPLE 2

In the same manner as in Synthesis Example 1 except for using 4.36 g of trans-4-pentylcyclohexanecarboxylic acid in place of p-n-octylbenzoic acid used in Synthesis Example 1 and using an azo type compound of the structural formula:

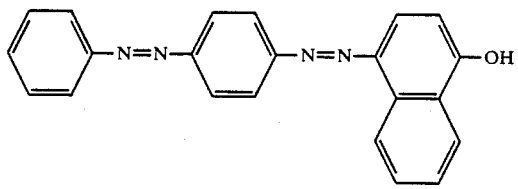

synthesized by a known process in place of the azo compound of the structural formula:

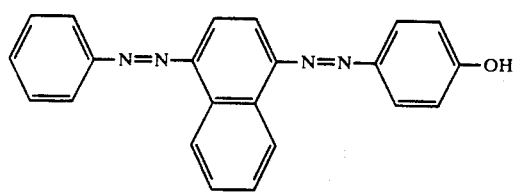

there was obtained dye No. 22 in Table 2. This dye showed a melting point of 137.0° to 138.7° C.

SYNTHESIS EXAMPLE 3

3.73 g of an azo type compound of the structural formula:

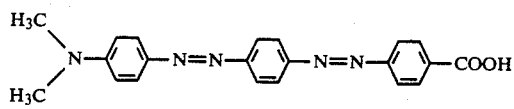

synthesized by a known process was reacted with 2.4 g of thionyl chloride together with 30 ml of dioxane and 0.1 ml of dimethylformamide at 80° C. for 2 hours. After cooling the reaction solution to 50° C., 5 ml of triethylamine was added thereto, and reaction was conducted at 80° C. for 2 hours. After cooling to a room temperature, the reaction mixture was poured into 300 ml of water. Purification of the thus obtained precipitate by column chromatography yielded dye No. 29 in Table 2. This dye showed a melting point of 185.8° to 186.8° C.

SYNTHESIS EXAMPLE 4

In the same manner as in Synthesis Example 3 except for using 4.23 g of an azo type compound of the structural formula:

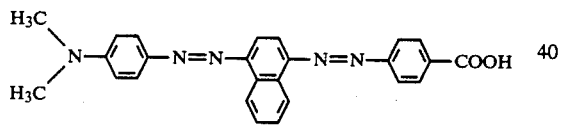

in place of 3.73 g of the azo type compound of the structural formula:

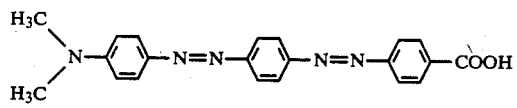

used in Synthesis Example 3, there was obtained dye No. 34 in Table 2. This dye showed a melting point of 196.8° to 197.5° C.

SYNTHESIS EXAMPLE 5

4.6 g of p-n-hexyloxybenzoic acid was reacted with 4.8 g of thionyl chloride together with 50 ml of dioxane and 0.2 ml of dimethylformamide at 90° to 100° C. for 2 hours. After cooling the reaction solution to 50° C., 8.2 g of an azo type compound of the structural formula:

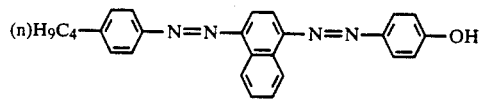

synthesized by a known process, 30 ml of dioxane, and 10 ml of triethylamine were added thereto, and reaction was conducted at 80° C. for 3 hours. After cooling to a room temperature, the reaction mixture was poured into 500 ml of water. Purification of the thus obtained precipitate by column chromatography gave dye No. 51 in Table 2 to be given hereinafter. This dye showed a melting point of 123° to 124° C.

SYNTHESIS EXAMPLE 6

In the same manner as in Synthesis Example 5 except for using 4.1 g of p-n-butoxybenzoic acid in place of p-n-hexyloxybenzoic acid used in Synthesis Example 5 and using an azo type compound of the structural formula:

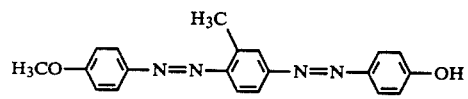

synthesized by a known process in place of the azo dye represented by the structural formula:

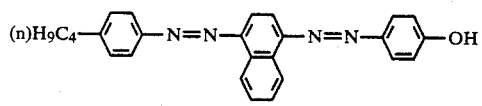

there was obtained dye No. 58 in Table 2. This dye showed a melting point of 156° to 157° C.

Pleochroic azo dyes of the present invention synthesized according to the processes described in Synthesis Examples 1 to 6 are tabulated in Table 2.

TABLE 2

| No. | Structural Formula | S/λ max (nm) |
| --- | --- | --- |
| 1 | ⌬—N=N—⌬—N=N—⌬—OCO—(H)—$C_5H_{11}(n)$ | 0.72/ 426 |
| 2 | ⌬—N=N—⌬—N=N—⌬—OCO—(H)—$CH_2OC_4H_9(n)$ | 0.72/ 426 |

TABLE 2-continued

| No. | Structural Formula | S/λmax (nm) |
|---|---|---|
| 3 | (n)H₉C₄—⟨⟩—N=N—⟨naphthalene⟩—N=N—⟨⟩—OCO—⟨H⟩—C₅H₁₁(n) | 0.74/429 |
| 4 | (n)H₉C₄—⟨⟩—N=N—⟨naphthalene⟩—N=N—⟨⟩—OCO—⟨H⟩—CH₂OC₃H₇(n) | 0.74/429 |
| 5 | ⟨⟩—N=N—⟨naphthalene⟩—N=N—⟨⟩—OCO—⟨⟩—C₈H₁₇(n) | 0.73/426 |
| 6 | O₂N—⟨⟩—N=N—⟨naphthalene⟩—N=N—⟨⟩—OCO—⟨⟩—C₈H₁₇(n) | 0.75/446 |
| 7 | NC—⟨⟩—N=N—⟨naphthalene⟩—N=N—⟨⟩—OCO—⟨⟩—C₈H₁₇(n) | 0.74/441 |
| 8 | ⟨⟩—N=N—⟨naphthalene⟩—N=N—⟨⟩—OCO—⟨⟩—CH₂OC₄H₉(n) | 0.73/426 |
| 9 | (n)H₉C₄—⟨⟩—N=N—⟨naphthalene⟩—N=N—⟨⟩—OCO—⟨⟩—C₄H₉(n) | 0.74/429 |
| 10 | (n)H₁₁C₅—⟨⟩—N=N—⟨naphthalene⟩—N=N—⟨⟩—OCO—⟨⟩—C₂H₄OC₄H₉(n) | 0.74/429 |
| 11 | (n)H₉C₄—⟨⟩—N=N—⟨naphthalene⟩—N=N—⟨⟩—OCO—⟨⟩—Cl | 0.75/428 |
| 12 | ⟨⟩—N=N—⟨naphthalene⟩—N=N—⟨⟩—OCO—⟨H⟩—⟨H⟩—C₃H₇(n) | 0.76/426 |
| 13 | ⟨⟩—N=N—⟨naphthalene⟩—N=N—⟨⟩—OCO—⟨⟩—⟨H⟩—C₅H₁₁(n) | 0.77/426 |
| 14 | (n)H₇C₃OH₂C—⟨⟩—N=N—⟨naphthalene⟩—N=N—⟨⟩—OCO—⟨H⟩—C₅H₁₁(n) | 0.74/429 |
| 15 | (n)H₇C₃OH₂C—⟨⟩—N=N—⟨naphthalene⟩—N=N—⟨⟩—OCO—⟨⟩—C₈H₁₇(n) | 0.74/429 |

TABLE 2-continued

| No. | Structural Formula | S/λ max (nm) |
|---|---|---|
| 16 | (n)H7C3—(H)—〈benzene〉—N=N—〈naphthalene〉—N=N—〈benzene〉—OCO—(H)—C5H11(n) | 0.77/ 430 |
| 17 | (n)H11C5—〈benzene〉—〈benzene〉—N=N—〈naphthalene〉—N=N—〈benzene〉—OCO—(H)—C5H11(n) | 0.77/ 432 |
| 18 | H3CO—〈benzene〉—N=N—〈benzene with H3C〉—N=N—〈benzene〉—OCO—(H)—C3H7(n) | 0.70/ 384 |
| 19 | (n)H9C4O2S—〈benzene〉—N=N—〈benzene with H3C〉—N=N—〈benzene〉—OCO—(H)—C5H11(n) | 0.68/ 395 |
| 20 | Cl—〈benzene〉—N=N—〈benzene〉—N=N—〈benzene with CH3〉—OCO—〈benzene〉—C4H9(n) | 0.71/ 367 |
| 21 | 〈benzene〉—N=N—〈benzene with OCH3, OCH3〉—N=N—〈benzene〉—OCO—〈benzene〉—C4H9 | 0.64/ 446 |
| 22 | 〈benzene〉—N=N—〈benzene〉—N=N—〈naphthalene〉—OCO—(H)—C5H11(n) | 0.76/ 409 |
| 23 | 〈benzene〉—N=N—〈benzene〉—N=N—〈naphthalene〉—OCO—〈benzene〉—(H)—C3H7(n) | 0.77/ 410 |
| 24 | (H3C)2N—〈benzene〉—N=N—〈benzene〉—COO—〈benzene〉—C4H9(n) | 0.70/ 448 |
| 25 | (H3C)2N—〈benzene〉—N=N—〈benzene〉—COO—〈benzene〉—CN | 0.72/ 451 |
| 26 | O〈morpholine〉N—〈benzene〉—N=N—〈benzene〉—COO—〈benzene〉—F | 0.68/ 435 |
| 27 | (H3C)2N—〈benzene〉—N=N—〈benzene〉—COO—〈benzene〉—COOCH3 | 0.71/ 453 |
| 28 | (H3C)2N—〈benzene〉—N=N—〈benzene〉—N=N—〈benzene〉—COO—〈benzene〉—(H)—C5H11(n) | 0.76/ 507 |

TABLE 2-continued

| No. | Structural Formula | S/λ max (nm) |
|---|---|---|
| 29 | (H3C)2N—C6H4—N=N—C6H4—N=N—C6H4—COO—C6H4—C4H9(n) | 0.76/506 |
| 30 | (H3C)2N—C6H4—N=N—C6H4—N=N—C6H4—COO—C6H4—CH2OC4H9(n) | 0.76/506 |
| 31 | (H3C)2N—C6H4—N=N—C6H4—N=N—C6H4—COO—[H]—C4H9(n) | 0.74/507 |
| 32 | (H5C2)2N—C6H4—N=N—C6H4—N=N—C6H4—COO—[H]—CH2OC3H7(n) | 0.74/507 |
| 33 | (n)H9C4—C6H4—OOC—C6H4—N=N—C6H4—N=N—C6H4—N(CH3)(CH2OC3H7(n)) | 0.75/506 |
| 34 | (H3C)2N—C6H4—N=N—(naphthyl)—N=N—C6H4—COO—C6H4—C4H9(n) | 0.79/548 |
| 35 | (H3C)2N—C6H4—N=N—(naphthyl)—N=N—C6H4—COO—C6H4—CH2OC4H9(n) | 0.79/548 |
| 36 | (H3C)2N—C6H4—N=N—(naphthyl)—N=N—C6H4—COO—C6H4—CN | 0.78/549 |
| 37 | (H3C)2N—C6H4—N=N—(naphthyl)—N=N—C6H4—COO—[H]—CH2OC4H9(n) | 0.77/549 |
| 38 | (H5C2)2N—C6H4—N=N—(naphthyl)—N=N—C6H4—COO—[H]—[H] | 0.77/549 |
| 39 | (pyrrolidinyl)—C6H4—N=N—(naphthyl)—N=N—C6H4—COO—C6H4—Br | 0.79/562 |
| 40 | (H3C)2N—C6H3(OH)—N=N—C6H4—COO—C6H4—C4H9 | 0.70/478 |
| 41 | (H3C)2N—C6H4—N=N—C6H4—COO—C6H4—N=N—C6H4—OC4H9(n) | 0.73/449 |

TABLE 2-continued

| No. | Structural Formula | S/λ max (nm) |
|---|---|---|
| 42 | (n)H₉C₄\N-C₆H₄-N=N-C₆H₄-COO-C₆H₄-OOC-C₆H₄-N=N-C₆H₄-N/C₄H₉(n), with (n)H₉C₄ and C₄H₉(n) on N | 0.77/ 450 |
| 43 | (n)H₁₇C₈\N-C₆H₄-N=N-C₆H₄-COO-C₆H₄-N=N-(naphthalene)-N=N-C₆H₄-C₄H₉(n), with (n)H₁₇C₈ on N | 0.76/ 435 |
| 44 | (n)H₉C₄-C₆H₄-OOC-C₆H₄-N=N-C₆H₄-N=N-(naphthalene)-N=N-C₆H₄-N/C₆H₁₃(n), with C₆H₁₃(n) on N | 0.78/ 573 |
| 45 | (n)H₁₇C₈-COO-C₆H₄-N=N-C₆H₄-N=N-(naphthalene)-N=N-C₆H₄-OOC-C₈H₁₇(n) | 0.80/ reddish yellow |
| 46 | (n)H₉C₄-COO-C₆H₄-N=N-C₆H₄-N=N-(naphthalene)-N=N-C₆H₄-OOC-C₄H₉(n) | 0.81/ reddish yellow |
| 47 | (n)H₇C₃OH₂C-C₆H₄-COO-C₆H₄-N=N-C₆H₄-N=N-(naphthalene)-N=N-C₆H₄-OOC-C₆H₄-CH₂OC₃H₇(n) | 0.81/ reddish yellow |
| 48 | (n)H₁₅C₇O-C₆H₄-COO-C₆H₄-N=N-C₆H₄-N=N-(naphthalene)-N=N-C₆H₄-OOC-C₆H₄-OC₇H₁₅(n) | 0.81/ reddish yellow |
| 49 | (n)H₁₁C₅-C₆H₄-COO-C₆H₄-N=N-C₆H₄-N=N-(naphthalene)-N=N-C₆H₄-OOC-(H)-C₅H₁₁(n) | 0.80/ reddish yellow |
| 50 | C₆H₅-N=N-(naphthalene)-N=N-C₆H₄-OOC-C₆H₄-OC₃H₇(n) | 0.73/ 425 |
| 51 | (n)H₉C₄-C₆H₄-N=N-(naphthalene)-N=N-C₆H₄-OOC-C₆H₄-OC₆H₁₃(n) | 0.74/ 426 |
| 52 | (n)H₇C₃-(H)-C₆H₄-N=N-(naphthalene)-N=N-C₆H₄-OOC-C₆H₄-OC₄H₉(n) | 0.78/ 428 |
| 53 | (n)H₁₁C₅-C₆H₄-C₆H₄-N=N-(naphthalene)-N=N-C₆H₄-OOC-C₆H₄-OC₄H₉(n) | 0.79/ 429 |
| 54 | O₂N-C₆H₄-N=N-(naphthalene)-N=N-C₆H₄-OOC-C₆H₄-OC₈H₁₇(n) | 0.75/ 446 |

TABLE 2-continued

| No. | Structural Formula | S/λ max (nm) |
|---|---|---|
| 55 | NC—⟨⟩—N=N—⟨naphthalene⟩—N=N—⟨⟩—OOC—⟨⟩—OC₁₈H₃₇(n) | 0.75/441 |
| 56 | (n)H₉C₄OOC—⟨⟩—N=N—⟨naphthalene⟩—N=N—⟨⟩—OOC—⟨⟩—OC₄H₉(n) | 0.75/440 |
| 57 | (n)H₇C₃—⟨H⟩—OOC—⟨⟩—N=N—⟨naphthalene⟩—N=N—⟨⟩—OOC—⟨⟩—OC₄H₉(n) | 0.77/440 |
| 58 | ⟨⟩—N=N—⟨⟩—N=N—⟨naphthalene⟩—OOC—⟨⟩—OC₄H₉(n) | 0.76/409 |
| 59 | (n)H₉C₄—⟨⟩—N=N—⟨⟩—N=N—⟨naphthalene⟩—OOC—⟨⟩—OC₄H₉(n) | 0.77/410 |
| 60 | (n)H₇C₃—⟨H⟩—⟨⟩—N=N—⟨⟩—N=N—⟨naphthalene⟩—OOC—⟨⟩—OC₄H₉(n) | 0.78/410 |
| 61 | H₃CO—⟨⟩—N=N—⟨CH₃-phenyl⟩—N=N—⟨⟩—OOC—⟨⟩—OC₄H₉(n) | 0.71/384 |
| 62 | (n)H₉C₄O₂S—⟨⟩—N=N—⟨CH₃-phenyl⟩—N=N—⟨⟩—OOC—⟨⟩—OC₄H₉(n) | 0.69/395 |
| 63 | ⟨⟩—N=N—⟨OCH₃/H₃CO-phenyl⟩—N=N—⟨⟩—OOC—⟨⟩—OC₄H₉(n) | 0.66/446 |
| 64 | Cl—⟨⟩—N=N—⟨⟩—N=N—⟨CH₃-phenyl⟩—OOC—⟨⟩—OC₄H₉(n) | 0.70/364 |

EXAMPLE 2

Examples of the pleochroic dyes of the present invention represented by the formula (III):

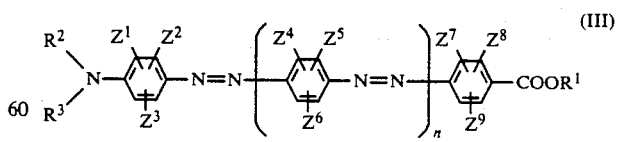

to be used in a liquid crystal composition are given in Table 3 together with hue and order parameter (S).

TABLE 3

| No. | Structural Formula | S/Hue |
|---|---|---|
| 65 | (n)H$_9$C$_4$OOC—C$_6$H$_4$—N=N—C$_6$H$_4$—N=N—C$_6$H$_4$—N(C$_2$H$_5$)$_2$ | 0.77/red |
| 66 | (n)H$_{17}$C$_8$OOC—C$_6$H$_4$—N=N—(naphthyl-1,4)—N=N—C$_6$H$_4$—N(C$_2$H$_5$)$_2$ | 0.75/bluish red |
| 67 | (n)H$_7$C$_3$OOC—C$_6$H$_4$—N=N—C$_6$H$_4$—N=N—C$_6$H$_3$(OH)—N(CH$_3$)$_2$ | 0.75/red |
| 68 | (n)H$_7$C$_3$OOC—C$_6$H$_4$—N=N—C$_6$H$_4$—N=N—C$_6$H$_3$(CH$_3$)—N(CH$_3$)$_2$ | 0.71/red |
| 69 | (n)H$_{18}$C$_7$OOC—C$_6$H$_4$—N=N—C$_6$H$_4$—N=N—C$_6$H$_4$—N(CH$_3$)(CH$_2$OC$_3$H$_7$(n)) | 0.76/red |
| 70 | (n)H$_{17}$C$_8$OOC—C$_6$H$_4$—N=N—(naphthyl-1,4)—N=N—C$_6$H$_3$(CH$_3$)—N(CH$_3$)$_2$ | 0.72/reddish violet |
| 71 | (n)H$_9$C$_4$OOC—C$_6$H$_4$—N=N—(naphthyl-1,4)—N=N—C$_6$H$_4$—N(CH$_3$)(C$_2$H$_4$OC$_2$H$_5$) | 0.74/bluish red |
| 72 | (n)H$_{17}$C$_8$OOC—C$_6$H$_4$—N=N—(naphthyl-1,4)—N=N—C$_6$H$_3$(OH)—N(CH$_3$)$_2$ | 0.74/violet |
| 73 | (n)H$_7$C$_3$O—C$_6$H$_4$—OOC—C$_6$H$_4$—N=N—C$_6$H$_4$—N=N—C$_6$H$_4$—N(CH$_3$)$_2$ | 0.76/red |
| 74 | (n)H$_9$C$_4$O—C$_6$H$_4$—OOC—C$_6$H$_4$—N=N—C$_6$H$_4$—N=N—C$_6$H$_3$(OH)—N(C$_2$H$_5$)$_2$ | 0.76/red |
| 75 | (n)H$_7$C$_3$O—C$_6$H$_4$—OOC—C$_6$H$_4$—N=N—(naphthyl-1,4)—N=N—C$_6$H$_4$—N(CH$_3$)(C$_2$H$_4$OC$_2$H$_5$) | 0.75/bluish red |
| 76 | (n)H$_{13}$C$_6$O—C$_6$H$_4$—OOC—C$_6$H$_4$—N=N—(naphthyl-1,4)—N=N—C$_6$H$_4$—N(C$_4$H$_9$(n))$_2$ | 0.74/bluish red |

TABLE 3-continued

| No. | Structural Formula | S/Hue |
|---|---|---|
| 77 | (n)H$_9$C$_4$O—⟨⟩—OOC—⟨⟩—N=N—(naphthyl)—N=N—(tetrahydroquinoline) | 0.74/ bluish red |
| 78 | (n)H$_9$C$_4$O—⟨⟩—OOC—⟨⟩—N=N—(naphthyl)—N=N—⟨⟩—N=N—⟨⟩—N(pyrrolidine) | 0.78/red |
| 79 | (n)H$_7$C$_3$O—⟨⟩—OOC—⟨⟩(Cl)—N=N—⟨⟩—N=N—(naphthyl)—N(C$_2$H$_5$)$_2$ | 0.74/violet |
| 80 | (n)H$_{13}$C$_6$O—⟨⟩—OOC—⟨⟩—N=N—(naphthyl)—N=N—⟨⟩(OCH$_3$)—N(C$_2$H$_5$)$_2$ | 0.73/violet |
| 81 | (n)H$_{13}$C$_6$O—⟨⟩—OOC—⟨⟩—N=N—⟨⟩—N=N—(naphthyl)—N=N—⟨⟩—N(CH$_3$)$_2$ | 0.79/ reddish blue |

The characteristic properties of each dye shown in Tables 2 and 3 were determined as follows. That is, one of the dyes shown in Tables 2 and 3 was added as a pleochroic dye to the foregoing phenylcyclohexane type mixed liquid crystal ZLI-1132, heated to 70° C. or higher, well stirred when the mixed liquid crystal became isotropic liquid, then allowed to cool. These procedures were repeated to dissolve the dye.

The thus prepared liquid crystal composition was sealed in an element device composed of upper and lower two glass plates with a plate-to-plate gap of 10 to 100 μm, with the surface of the plate to be in contact with the liquid crystal having been coated with a polyamide resin and, after hardening the resin, having been subjected to rubbing treatment to conduct homogeneous orientation treatment. In the above-described element device having been subjected to the orientation treatment, the above-described liquid crystal composition took, when no electric field was applied thereto, a homogeneously oriented state as shown in FIG. 1, and the dye molecules are similarly oriented following the host liquid crystal.

Figure 1:
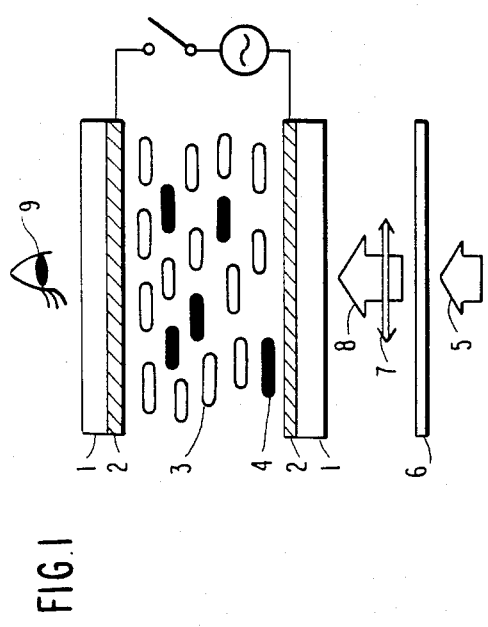
FIG. 1 and FIG. 6 show schematic cross sections of display devices in accordance with the present invention in a field-off state.

The structure of liquid crystal display device shown in FIG. 1 is that which is common to ordinary devices except for containing the liquid crystal composition of the present invention. That is, the element device comprises upper and lower transparent glass plates 1, transparent electrodes 2 formed under the two plates, and the liquid crystal composition of the present invention sandwiched between the two glass plates and comprising liquid crystal molecules 3 and pleochroic dye molecules 4. Incident natural light is polarized, when passing through a polarizing sheet 6, to a polarizing direction 7, and reaches the device as incident polarized light 8. Additionally, 9 indicates a viewer.

Absorption spectrum of the liquid crystal composition of the present invention was measured using the light polarized parallel and perpendicular to the direction of orientation of the liquid crystal molecules to obtain absorbances $A_{//}$ and $A\perp$ of the dye for the polarized lights and maximum absorption wavelength. In obtaining absorbance of the dye, corrections were made for the absorption of host liquid crystal and of glass plates and for reflection loss of the element device. Order parameter S was obtained according to the foregoing equation (II) using the thus determined absorbances $A_{//}$ and $A\perp$ of the dye for the polarized lights.

In order to obtain data on practical stability of the dyes shown in Table 2, accelerated weathering tests were conducted. That is, the above-described liquid crystal compositions respectively containing the dyes shown in Table 2 sealed in the above-described element devices were left for about 100 hours in a sunshine weather meter to follow the absorbance-decreasing ratio and the consumed current-increasing ratio. The sunshine weather meter used in this Example contained a carbon arc lamp as a light source, with the temperature in the sample room being about 50° C. and no humidifying or water spray being conducted therein.

When the above-described accelerated weathering tests were conducted for 100 hours with protecting the element devices by means of an ultraviolet ray-cutting filter, every dye shown in Table 2 underwent a decrease in absorbance of only 10% or less and an increase in consumed current value of not more than double the value before the weathering test when an AC of 32 Hz and 5 V was applied. In particular, dyes No. 1, 3, 5, 9, 12, 13, 16, 17, 22, 23, 50, 51, 52, 53, 58, 59 and 60 shown in Table 2 underwent less fading and, even when the accelerated weathering tests were conducted without protection of the element devices by means of the ultraviolet ray-cutting filter, they underwent a decrease in absorbance of not more than 10%. Thus, the dyes can compare, in light stability, with anthraquinone type dyes of, for example, the structure:

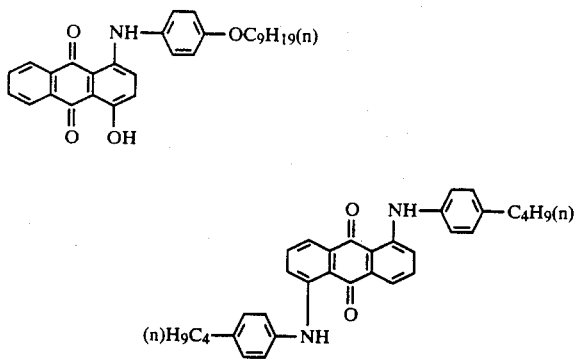

which are known highly light-stable pleochroic dyes for use in guest-host display.

Conventional pleochroic azo dyes do not possess such a high light stability, and it is not too much to say, at least from a practical standpoint, that the present invention provides for the first time pleochroic azo dyes having the same light stability as that of highly light-stable anthraquinone type pleochroic dyes.

The dyes of the present invention are also excellent in heat stability and, when kept at 90° C. for 100 hours under dark condition, they underwent a cecrease in absorbance of not more than 10% and an increase in consumed current of not more than double the value before the test when an AC of 32 Hz and 5 V was applied.

EXAMPLE 3

Figure 2:
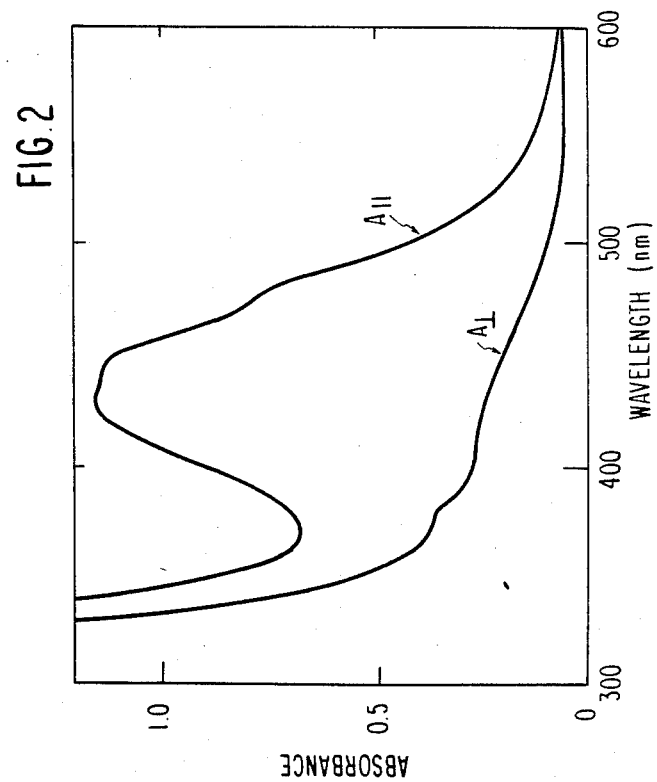

A liquid crystal composition prepared by adding dye No. 5 in Table 2 to the same liquid crystal as used in Example 2 in a content of 1.11% by weight was sealed in the same element device as used in Example 2 (plate-to-plate gap: about 10 μm). The absorption spectrum of the liquid crystal composition of this Example is shown in FIG. 2, wherein curve i shows $A_{//}$ and curve ii $A\perp$. Maximum absorption wavelength in visible region was 426 nm, and order parameter S of the dye of this Example at the maximum absorption wavelength was 0.73.

EXAMPLE 4

A liquid crystal composition prepared by adding dye No. 29 in Table 2 to the same liquid crystal as used in Example 2 in a content of 0.19 wt% was sealed in the same element device as used in Example 3 (plate-to-plate gas: 50 μm), and absorption spectrum was measured in the same manner as in Example 2. The absorption spectrum of the liquid crystal composition of this Example is shown in FIG. 3. Maximum absorption wavelength in visible region was 508 nm, and order parameter S of the dye of this Example at the maximum absorption wavelength was 0.76.

EXAMPLE 5

Figure 4:
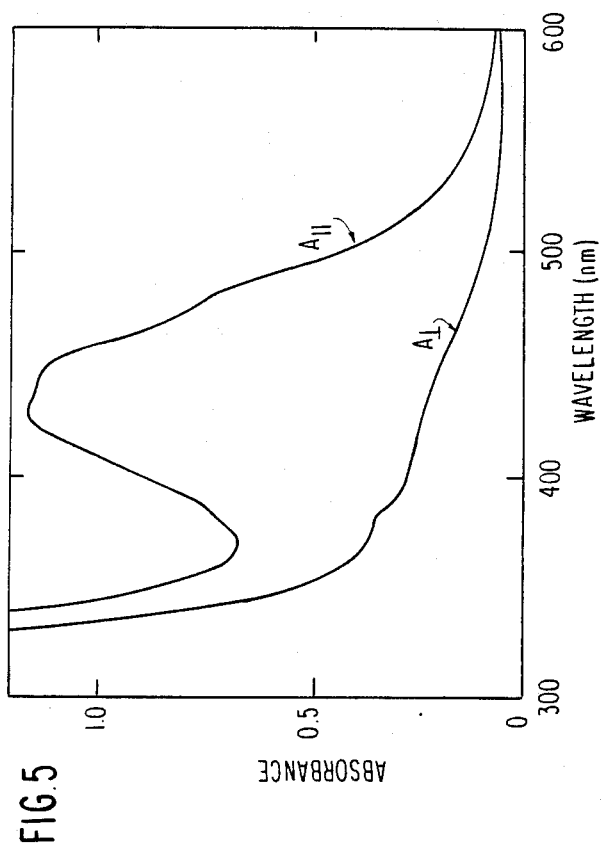
Figure 5:
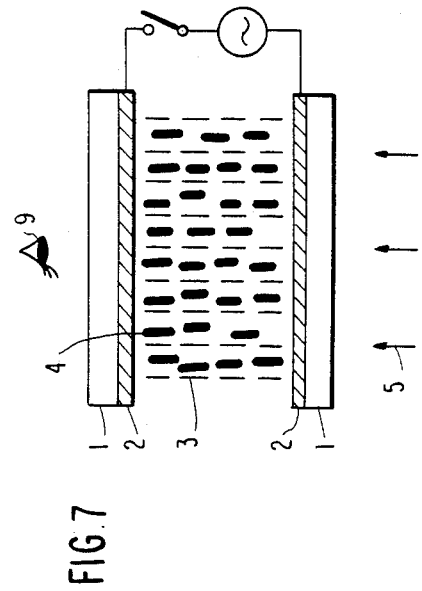
Figure 6:
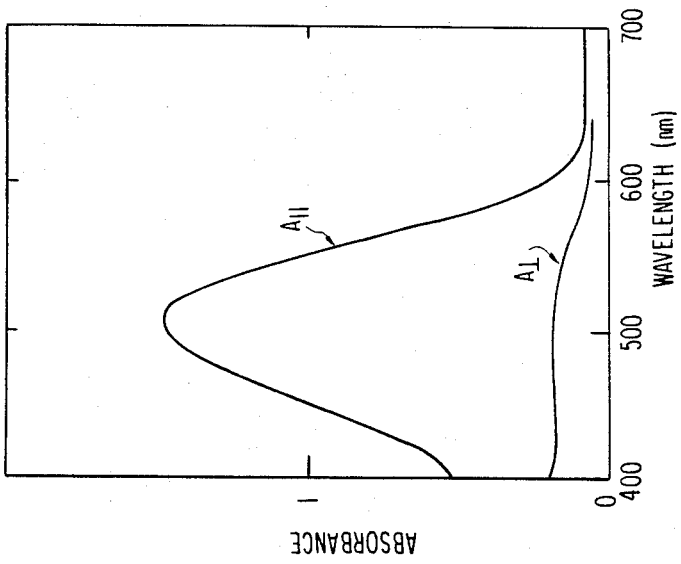
Figure 7:
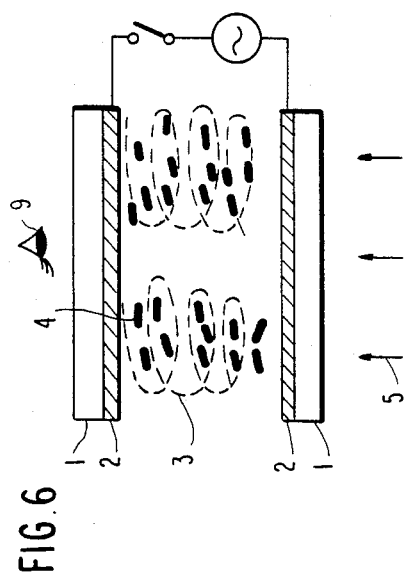
FIG. 7 shows a schematic cross section of a display device in accordance with the present invention in a field-on state.

A liquid crystal composition prepared by adding dye No. 73 in Table 3 to the same liquid crystal as used in Example 1 in a content of 0.2% by weight was sealed in the same element device as used in Examples 3 and 4 (plate-to-plate gas: 50 μm), and adsorption spectrum was measured in the same manner as in Examples 2, 3 and 4. The spectrum of the liquid crystal composition of this Example is shown in FIG. 4. Maximum absorption wavelength in visible region was 509 nm, and order parameter S of the dye of this Example at the maximum absorption wavelength was 0.76.

While the invention has been described in detail and with reference to specific embodiments thereof, it will be apparent to one skilled in the art that various changes and modifications can be made therein without departing from the spirit and scope thereof.

What is claimed is:

1. A liquid crystal composition comprising a liquid crystal material selected from the group consisting of nematic liquid crystals, smectic liquid crystals and liquid crystals utilizing a cholesteric-nematic phase transition, and pleochroic azo dyes represented by the formula (I):

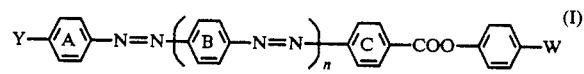

wherein Y represents alkoxy or

(wherein $R^2$ and $R^3$ each represents hydrogen, alkyl or alkoxyalkyl, and $R^2$ and $R^3$ may be connected to each other to form a nitrogen-containing ring together with the adjacent nitrogen); n represents 1 or 2; W represents alkyl containing 3 to 18 carbon atoms, alkoxyalkyl, cycloalkyl, aryl, cyano, halogen, acyloxy, carboxylic acid ester, and arylazo; and one of

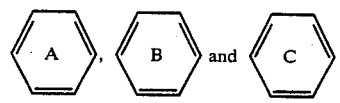

represents a 1,4-naphthyl ring.

2. A display device comprising an element device constituted by two base plates at least one of which is transparent, which are in parallel with each other and spaced from each other via a spacer, and on which electrodes of desired pattern are provided in a facing manner, having sealed therein a liquid crystal composition comprising a liquid crystal material selected from the group consisting of nematic liquid crystal, a smectic liquid crystals and liquid crystals utilizing cholesteric-nematic phase transition, and pleochroic azo dyes represented by the formula (I):

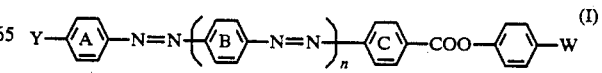

wherein Y represents alkoxy or

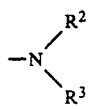
(wherein $R^2$ and $R^3$ each represents hydrogen, alkyl or alkoxyalkyl, and $R^2$ and $R^3$ may be connected to each other to form a nitrogen-containing ring together with the adjacent nitrogen); n represents 1 or 2; W represents alkyl containing 3 to 18 carbon atoms, alkoxyalkyl, cycloalkyl, aryl, cyano, halogen, acyloxy,
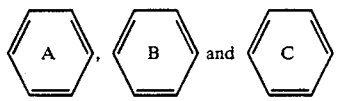
represents a 1,4-naphthyl ring.
* * * * *